United States Patent Office 3,574,135
Patented Apr. 6, 1971

3,574,135
PRODUCTION OF IMPROVED THICKENED OR THIXOTROPIC COMPOSITIONS FROM FLUID ENERGY MILLED COLLOIDAL SILICA
Francis R. Sampson, 2320 W. Greenwood, Glendale, Wis. 54437, and Richard F. Heitmiller, 2520 York Road, Raleigh, N.C. 27608
No Drawing. Continuation-in-part of application Ser. No. 483,779, Aug. 30, 1965. This application Feb. 20, 1968, Ser. No. 706,778
Int. Cl. B01j 13/00; C01b 33/14; C10m 5/02
U.S. Cl. 252—317        10 Claims

ABSTRACT OF THE DISCLOSURE

The present invention provides a process for improving the (1) thickening and/or (2) thixotropic properties of certain colloidal silicas. Said process broadly comprises fluid energy milling of certain colloidal silicas having BET-$N_2$ surface areas of less than about 300 m.$^2$/gram. The thusly treated silicas are found to be useful in the production of greases and sag resistant gel coatings.

---

This application is a continuation-in-part of copending application U.S. Ser. No. 438,779, filed Aug. 30, 1965 and now abandoned.

Many aqueous and organic liquid compositions, such as liquid epoxy resins, are normally Newtonian in flow characteristics in that the shear rate is directly proportional to the shear stress. The advantages of non-Newtonian systems are, however, well known to industry. For instance, when uniform resinous coatings are to be applied to non-uniform, sloping or vertical surfaces, the flow properties of the coating resin must be of such quality that the coatings can be easily applied to the surface, and thereafter not flow, drain or sag from said surface.

This quality, commonly known as thioxtropy, is often imparted to aqueous and organic compositions by the incorporation therein of an extremely finely-divided colloidal silica. Generally, between about 0.05 and about 35% by weight of the total composition of silica is utilized, the amount being dependent upon the required level of thixotropy, the type of silica used as the thixotropic agent, the patricular liquid, and the nature of the fillers present. It is normally desirable, however, to use as small an amount of the silica as possible; for instance, between about 0.01 and about 15 weight percent. Pyrogenic silicas produced in a high temperature, vapor phase reaction, such as a flame hydrolysis of $SiCl_4$ vapors, have heretofore been normally preferred since they provide much greater thickening efficiency than the wet precipitated silicas at such low concentrations. Further, colloidal silicas have also been found to be extremely useful as thickening agents for various normally highly fluid liquids. For instance, greases can be produced from hydrocarbon oils by the incorporation therein of suitable amounts of colloidal silica.

It is generally acknowledged in the art that the rheological properties of a given colloidal silica/liquid system are dependent, to a considerable extent, upon the manner in which the silica is dispersed into the system. Normally, the greater the degree of dispersion the greater and/or more stable are the rheological effects. Thus, dispersion of silica into liquid systems to provide rheological compositions is often accomplished utilizing a relatively high degree of dispersion energy involving the use of expensive high shear producing equipment such as high speed blenders, three roll mills, homogenizers and the like. In accordance with the present invention, however, it is often possible to achieve desired levels of rheological properties with relatively low shear dispersion methods which levels have been heretofore attainable only by use of high shear dispersion techniques and apparatus.

It is a principal object of the present invention to provide improved rheological compositions.

It is another object of the present invention to provide a novel process for increasing the thickening efficiency of certain colloidal silicas.

It is still another object of the present invention to provide a novel process for increasing the thixotropic efficiency of certain colloidal silicas.

Other objects and advantages will in part be obvious and will in part appear hereinafter.

In accordance with the present invention the thickening and thixotropic efficiency of certain colloidal silicas having a BET-$N_2$ surface area of less than about 300 m.$^2$/gram can be vastly improved by subjecting such silicas to a fluid energy milling treatment.

By fluid energy milling it is meant generally the process by which particulate solids are caused to impact at high velocity against hard surfaces and/or each other while flowing through a confined chamber under the influence of one or more fast moving and very turbulent gas streams. Many types of apparatus for accomplishing fluid energy milling suitable for the purpose of the present invention are known to the art.

In the class of suitable apparatus a gas is admitted in high velocity streams at an angle around a portion or all of the periphery of a grinding and/or classifiying chamber means and the subject solids fed thereinto. The solids course around the periphery of the chamber and the turbulence and rotational energy imparted to the solids by said high velocity gas streams results in a high degree of milling of the solid particles. Exemplary of this type of apparatus are the Micronizer, produced by Sturtevant Mill Corporation; Jet Pulverizer, produced by Jet Pulverizer Company; Jet-O-Mizer, Fluid Energy Processing and Equipment Company; and the Reductionizer, Reduction Engineering Corporation. In another well known class of fluid energy milling equipment, the subject solids are conveyed into suitable chamber means wherein at least two high velocity streams impact upon each other. This last mentioned class of milling apparatus is exemplified by the Majac Mill, Majac Incorporated.

The operations of fluid energy milling equipment are generally well understood by those skilled in the art and need not be discussed in detail here. However, it should be noted that the gases utilized for fluid energy milling are generally air or steam, both of which are suitable for milling the silicas in accordance with the process of the invention. Obviously, however, other gases are also suitable, provided, of course, that deleterious reaction with the silica is avoided. Thus, such gases as nitrogen, carbon dioxide, argon and neon can also be utilized if desired. A detailed account of fluid energy milling equipment and operations thereof can be had when reference is made to Perry's Chemical Engineering Handbook, fourth edition, Mc-Graw-Hill Book Company, 1963, 8:42–43. It should be noted that the advantageous results flowing from the fluid energy milling step are completely surprising, particularly in view of the fact that when colloidal silicas are milled by conventional mechanical procedures, such as ball milling, hammer milling, roll milling, pin milling and the like not only is there no improvement in the rheological properties of the silica but often said properties are deleteriously affected.

The silicas suitable for treatment by the process of the present invention are generally well known in the art. Said silicas are characterized by an extremely small average ultimate particle diameter of less than about 100 millimicrons; and a relatively low porosity, as evidenced by a BET-$N_2$ surface area of less than about 300 m.$^2$/gram.

Such silicas are producible by various techniques, such as (1) precipitation from a dilute aqueous silicate solution such as sodium silicate or "water glass" by acidulation of said solution, or (2) pyrogenically, by the high temperature hydrolysis and/or oxidation of a volatilized silicon containing compound. The preferred feedstock silicas of the invention have surface areas of less than about 225 m.²/gram.

In U.S. Pat. 3,185,301, to Folkins and Beber, May 25, 1965, there is disclosed an improved method for the classification of particulate silica and alumina gels. Said method broadly comprises the inclusion of aqueous or organic moisture in the pore structure of the silica or alumina gel to be classified followed by a fluidized classification procedure such as cyclone separation or micronization. When micronization is the particular method utilized not only is the feedstock silica gel classified but also oversize or coarse particles thereof are attrited to acceptable sizes. Subsequent to the classification step the gel is dried. The silica feedstocks and the results achieved by fluid energy milling thereof in accordance with the present invention are, however, completely distinguishable and unobvious from the silica gels and process disclosed in the aforedescribed Folkins et al. patent. Firstly, silica gels are normally markedly porous materials as is evidenced by their relatively enormous BET-$N_2$ surface areas, i.e. greater than about 350 m.²/gram and often greater than about 500 m.²/gram. The silica feedstocks of the present invention, however, have surface areas of less than about 300 m.²/gram and are, accordingly, relatively non-porous. Moreover, the gel structure of silica gels is continuous while in the silica feedstocks of the present invention any gel structure, if present at all, is discontinuous.

In the following illustrative examples, determination of thixotropic index was accomplished by measuring the Brookfield viscosity of the sample undergoing test at two spindle speeds (6 r.p.m. and 60 r.p.m.). The thixotropic index is calculated by dividing the measured viscosity at 6 r.p.m. by the viscosity at 60 r.p.m. Obviously, the larger the resulting quotient the greater the shear sensitivity or "thixotropy" of the sample.

EXAMPLE 1

Into the bowl of a 1000 milliliter high speed (18,000 r.p.m.) propeller stirred blender there was charged 500 grams of a polyester resin having Newtonian flow characteristics and a viscosity of about 300 centipoises. Next, there was added 10 grams of a precipitated colloidal silica having an average ultimate particle diameter of about 20 m$\mu$, and a BET-$N_2$ surface area of about 150 m.²/gram. The blender was then operated for about 5 minutes and the resulting mixture removed. Brookfield viscosities are then determined and are illustrated in the "Control" column of Table I following.

The above procedure is then repeated with the exception that prior to addition of the silica to the polyester said silica is treated in a 4" Micronizer under the following conditions:

Pot temperature—270°
Wall pressure—140 p.s.i.g. (steam)
Feed pressure—145 p.s.i.g. (steam)
Rate of silica feed—324 g./min.

The fluid energy milling treatment did not materially affect the particle size or BET-$N_2$ surface area of the silica. Said milled silica was incorporated into the polyester resin as hereinbefore described. Viscometric analysis of the sample yielded the results shown in the "micronized silica" column of Table I.

When the above procedure is repeated with the exception that the silica is ball milled for about 5 hours instead of fluid energy milled the resulting rheological polyester composition exhibits the properties shown in Table I in the column designated "Ball Milled Silica."

TABLE I.—BROOKFIELD VISCOSITY

|  | Control | Micronized silica | Ball milled silica |
|---|---|---|---|
| 6 r.p.m. | 800 | 1,500 | 790 |
| 60 r.p.m. | 550 | 720 | 550 |
| Thixotropic index | 1.45 | 2.08 | 1.4 |

EXAMPLE 2

There was charged into a 1000 milliliter beaker about 500 grams of Nuray 66, a mineral oil having a viscosity of about 200 centipoises and produced by Esso Standard Division, Humble Oil and Refining Company. A laboratory propeller stirrer was inserted into the liquid and operated at about 1300 r.p.m. for about 10 minutes. During the first five minutes of operation there was added incrementally to the stirring liquid 20 grams of Cab-O-Sil, a pyrogenic silica produced by Cabot Corporation, having an average ultimate particle diameter of about 15 millimicrons and a BET-$N_2$ surface area of about 180 m.²/gram. Upon completion of the mixing cycle the resulitng mixture was analyzed with a Brookfield viscometer. The results of said analysis are shown in Table II under the column, "Low Shear, Control." Another oil/silica mixture was then produced containing similar amounts of oil and silica. However, the mixing of the ingredients was accomplished under stringent shear conditions by effecting two tight passes on a three-roll mill at respective roll speeds front to back of 34 r.p.m., 100 r.p.m. and 1600 r.p.m. Thereafter the resulting mixture was analyzed viscometrically. The results of said analysis are shown under the column "High Shear, Control," Table II.

Next, silica of the same type was subjected to fluid energy milling in a 4" Micronizer at the following conditions:

Pot temperature—70° F.
Wall pressure—60 p.s.i.g. (air)
Feed pressure—65 p.s.i.g. (air)
Rate of silica feed—610 g./min.

The treated silica, the particle size and BET-$N_2$ surface area of which was essentially the same as the control silica, was then utilized to formulate oil/silica mixtures in the same manner as hereinbefore described, i.e. under low shear and high shear conditions of mixing. Subsequent viscometric analysis of the resulting mixtures are shown in Table II under the respective title "Low Shear Micronized" and "High Shear, Micronized."

TABLE II.—BROOKFIELD VISCOSITY

|  | Low shear control | Low shear micronized | High shear control | High shear micronized |
|---|---|---|---|---|
| 6 r.p.m. | 11,500 | 18,400 | 14,400 | 19,800 |
| 60 r.p.m. | 2,750 | 3,130 | 2,690 | 3,310 |
| Thixotropic index | 4.2 | 6.0 | 5.3 | 6.0 |

EXAMPLE 3

There was charged into a 2000 milliliter beaker, 1000 grams of a paraffin oil having a viscosity of about 200 centipoises and 10 grams of a precipitated silica of the same type used for the control portion of Example 1. The mixture was then mixed with a high shear laboratory blender for about 10 minutes at about 18,000 r.p.m. The resulting mixture was then analyzed and the results are shown in Table III under the column, "Control, Silica." A similar mixture was then produced; however, there was utilized in this case 10 grams of the fluid energy milled silica produced in Example 1. The viscometric data forthcoming upon testing of this mixture is shown in Table III in the column "Micronized Silica."

When the paraffin oil/silica mixture is prepared in the same manner as above with the exception that the silica was pebble milled for about 4 hours instead of fluid energy milled the resulting composition exhibits the rheological properties listed in the column "Pebble Milled Silica," Table III.

TABLE III.—BROOKFIELD VISCOSITY

|  | Control silica | Micronized silica | Pebble milled silica |
|---|---|---|---|
| 6 r.p.m | 320 | 1,020 | 300 |
| 60 r.p.m | 250 | 360 | 250 |
| Thixotropic index | 1.28 | 2.84 | 1.20 |

EXAMPLE 4

There is charged into a 1000 milliliter beaker about 500 grams of dioctyl phthalate having a viscosity of about 72 centipoises. Next, the liquid is stirred for a period of about 15 minutes with a laboratory stirrer operated at about 1000 r.p.m. During the first five minutes of said stirring there is added to the beaker 20 grams of a pyrogenic silica of the type utilized in Example 2 as the control silica. Following the stirring period, the resulting mixture is tested and the resulting viscosities are shown in Table IV below in the column designated "Low Shear, Control."

Next, the above procedure is again carried out with the exception that mixing is accomplished under high shear conditions utilizing a high shear blender at a rotor speed of about 18,000 r.p.m. for a period of about 15 minutes. Viscometric data from this run is found in Table IV under the column "High Shear, Control."

Next, silica of the type utilized above is subjected to a fluid energy milling treatment in a 4 inch Micronizer under the following conditions:

Pot temperature—350° F.
Wall pressure—60 p.s.i.g. (air)
Feed pressure—65 p.s.i.g. (air)
Rate of silica feed—610 g./min.

Said milled silica is then mixed into dioctyl phthalate under low shear and high shear conditions as hereinbefore described. Subsequently, viscometric analysis of the resulting mixtures yielded the results shown in Table IV under the respective columns "Low Shear, Micronized Silica" and "High Shear, Micronized Silica."

TABLE IV.—BROOKFIELD VISCOSITY

|  | Low shear control | High shear control | Low shear micronized silica | High shear micronized silica |
|---|---|---|---|---|
| 6 r.p.m | 1,740 | 4,300 | 2,960 | 4,640 |
| 60 r.p.m | 606 | 812 | 700 | 752 |
| Thixotropic index | 2.9 | 5.3 | 4.2 | 6.2 |

It is not known precisely why the colloidal silicas treated in accordance with the process of the present invention have improved rheological characteristics. It is believed, however, that fluid energy milling of said silicas results in the fracture of secondary agglomerates of particles which are not readily fractured during dispersion operations and thus effectively provides a proportionately greater effective rheologically active surface/unit weight of silica when ultimately incorporated into a liquid system. Thus, practice of the present invention can, in conjunction with low shear techniques, provide many of the desirable rheological effects normally previously achievable only by dispersing the silica into liquid media by high shear techniques. This a very great advantage because it is often possible to avoid the rigors and expense of high shear dispersion techniques in formulating said liquid compositions and yet achieve the desired rheological properties therein.

Obviously, many changes can be made in the above examples and description without departing from the scope of the invention.

For instance, gases other than air and steam can be utilized to provide the milling energy required, such as, for instance, nitrogen.

Moreover, it should be recognized that other materials can form part of the rheological compositions such as fillers, pigments and the like. In particular, additives which often enhance the rheological properties of certain colloidal silica/liquid mixtures such as amines, glycols, sulfonated hydrocarbons, fatty acid derivatives, etc., can also be utilized in conjunction with the silicas produced in accordance with the invention.

Accordingly, it is intended that the above disclosure be regarded as illustrative in nature and as in no way limiting the scope of the invention.

What is claimed is:

1. A process for improving the rheological properties of colloidal silicas having an average ultimate particle diameter of less than about 100 millimicrons and a BET-$N_2$ surface area of less than about 300 m.$^2$/gram which comprises subjecting said silica to fluid energy milling.

2. The process of claim 1 wherein said silica has an average ultimate particle diameter of less than about 50 millimicrons.

3. The process of claim 1 wherein said silica has a BET-$N_2$ surface area of less than about 225 m.$^2$/gram.

4. The process of claim 1 wherein said silica is a pyrogenic silica.

5. The process of claim 1 wherein said silica is a precipitated silica.

6. The process of claim 1 wherein said fluid energy milling is characterized by spinning said silica about an enclosed zone into the periphery of which zone there is charged a gas.

7. The process of claim 1 wherein the fluid providing energy is air.

8. The process of claim 1 wherein the fluid providing energy is steam.

9. A process for producing improved thickened or thixotropic compositions which comprises the steps of:
   (a) subjecting colloidal silica having an average ultimate particle diameter of less than about 100 millicrons and a BET-$N_2$ surface area of less than about 300 m.$^2$/gram to treatment by fluid energy milling, and
   (b) dispersing said treated silica into a liquid media in an amount sufficient to impart thickening or thixotropy to the resulting composition.

10. The process of claim 9 wherein the amount of milled silica utilized represents between about 0.1 and about 15 percent of said composition.

References Cited

UNITED STATES PATENTS

| 2,605,228 | 7/1952 | Alexander et al. | 252—313 |
| 2,965,568 | 12/1960 | Marsden et al. | 252—28 |
| 3,041,140 | 6/1962 | Alexander | 252—313X |
| 3,185,301 | 5/1965 | Folkins et al. | 23—182X |

RICHARD D. LOVERING, Primary Examiner

U.S. Cl. X.R.

23—182R; 252—28, 309, 313S, 314